Figure 1:
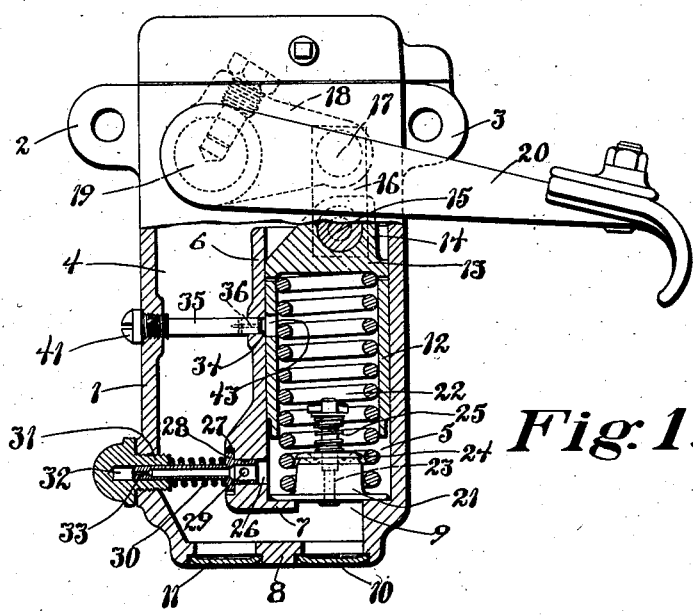

May 20, 1930.  R. M. LOVEJOY  1,759,123

SHOCK ABSORBER

Filed May 12, 1923

Inventor—
 Ralph M. Lovejoy.
By Heard Smith & Tennant
 Attorneys.

Patented May 20, 1930

1,759,123

UNITED STATES PATENT OFFICE

RALPH M. LOVEJOY, OF BOSTON, MASSACHUSETTS

SHOCK ABSORBER

Application filed May 12, 1923. Serial No. 638,562.

This invention relates to improvements in shock absorbers adapted to cushion the movement of two relatively movable members, and the object thereof is to provide a shock absorber which will be adapted more effectively to dissipate the shock of relatively slight movements between said movable members.

The invention comprises certain improvements upon the type of shock absorbed disclosed in my prior patents upon improvements in shock absorbers No. 1,324,913 granted December 16, 1919, and No. 1,450,601 granted April 3, 1923, and my prior application Serial Number 514,378 filed November 10, 1921.

In general construction this type of shock absorber comprises a casing adapted to be secured to one of the relatively movable members, such as, the body of a vehicle, and having a fluid chamber or reservoir with a cylinder therein, a piston reciprocably mounted in the cylinder having means adapted to be connected to the other relatively movable member, such as, the axle of a vehicle, means being provided to permit the flow of fluid from the fluid chamber or reservoir to the cylinder when the piston moves in one direction and means being provided to impede the flow of fluid from the cylinder to the fluid chamber or reservoir when the piston moves in the opposite direction.

In the construction disclosed in these patents a restricted communication between the cylinder and reservoir is provided to permit the passage of fluid from the cylinder to the reservoir during the movement of the piston which is resisted by the means which restricts the flow of the fluid from the cylinder.

The object of the present invention is to provide means operable to impose resistance to the piston only during slight movements of the piston from neutral or normal position and thereby to cushion, or aid in cushioning, slight shocks and which mechanism will be rendered inoperative upon movement of the piston beyond a predetermined distance from normal position when the mechanism is operated to cushion major shocks.

More particularly the object of the present invention is to provide a supplemental passage establishing communication between the cylinder and the reservoir when the piston is in normal or neutral position and which will permit a restricted flow of fluid between the reservoir and piston upon slight movements of the piston to aid in absorbing relatively slight shocks and also in providing means for rendering such passage inoperative when the piston moves beyond a predetermined distance from normal position.

A further object of the invention is to provide means adapted to permit the piston to resume normal position more quickly when its movement closely approaches normal position.

Other objects and features of the invention will more fully appear from the following description and the accompanying drawing and will be particularly pointed out in the claims.

Figure 2:
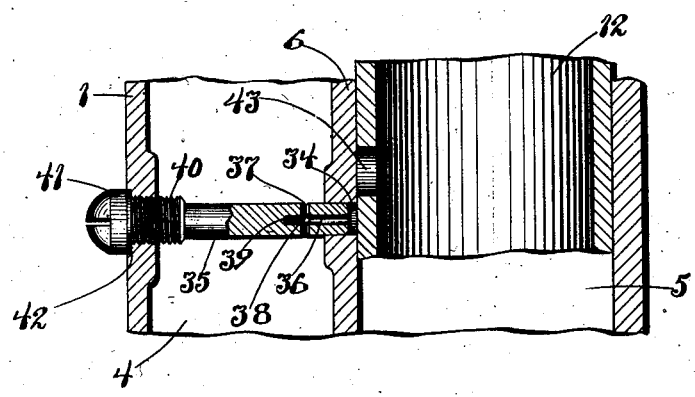

A preferred embodiment of the invention is illustrated in the accompanying drawing, in which, Fig. 1 is a view, partially in elevation and partially in vertical axial section, of a shock absorber embodying the invention;

Fig. 2 is an enlarged detail vertical sectional view through the wall of the casing, cylinder and piston, showing partially in section a plug provided with a restricted passage leading from the reservoir to the cylinder.

Shock absorbers of the hydraulic type, such as are disclosed in my prior patents above identified, comprise a fluid-containing chamber or reservoir and a cylinder having a piston reciprocable therein, the cylinder being provided with one or more valves operating to permit a substantially free flow of fluid from the reservoir into the cylinder upon movement of the piston in one direction and acting to restrict the flow of fluid from the cylinder to the reservoir upon movement of the piston in the opposite direction.

In order to provide means for absorbing the heavy shocks occasioned by relatively great movements of the movable members to which the piston and casing of the shock absorber are connected, a relatively strong spring is required to resist the flow of fluid from the cylinder to the reservoir during the cushioning movement of the piston. In order to absorb relatively light shocks the shock absorbers disclosed in my prior patents were provided with restricted ports leading from the cylinder to the reservoir. These ports, however, continuously established communication between the cylinder and reservoir and were operative during the entire movement of the piston.

The object of the present invention, as above stated, is to provide a supplemental means for establishing a restricted flow of the fluid between the cylinder and reservoir during relatively slight movements of the piston from its normal or neutral position, but which will be rendered ineffective upon greater amplitude of movement of the piston so that slight shocks, such as are occasioned when a vehicle equipped with shock absorbers is running over a cobbled street, will be wholly or partially absorbed by the resistance to the flow of the fluid through the supplemental passage, whereas when the piston is moved through a greater range the supplemental passage is rendered inoperative and full resistance imposed against the movement of the piston by the spring-actuated relief valve.

By reason of such a construction a shock absorber is provided which is more sensitive to cushion light shocks and also more effective in cushioning the heavier shocks.

The preferred form of shock absorber illustrated in the accompanying drawing comprises a casing 1, preferably substantially rectangular in cross section, having suitable means, such as, bosses 2 and 3 to receive bolts by means of which it may be secured to one of the relatively movable members, such as the frame of the vehicle, said casing presenting a fluid chamber 4 and an internal cylinder 5 the wall 6 of which desirably is cast integral with the walls of the casing and extends only a portion of the length of the casing. The cylinder 5 has a head 7 which likewise desirably is formed integral with the casing and is located at a distance from the lower end wall 8 of the casing. A port 9 through the head 7 of the cylinder provides means through which fluid is admitted from the reservoir into the casing. For convenience of construction the lower end 8 of the casing is provided with two large, preferably circular, apertures through which cores used in casting the casing may be removed and which also provide means of access to the interior of the casing.

Suitable closures, preferably resilient crowned disks 10 and 11, forced into countersinks in the walls of the openings in the end of the casing, serve to close the openings when the shock absorber has been assembled.

The piston, which is reciprocably mounted in the cylinder 5, desirably is of hollow construction comprising a cylindrical portion 12 which fits within the cylinder 5 and a head 13 having an upwardly extending boss 14 provided with a transverse aperture to receive a stud 15 by means of which it is connected to the lower end of a link 16, the opposite end of which is pivotally connected to a stud 17 upon the interior arm 18 of a rock shaft 19, the outer arm 20 of which is adapted to be secured by a flexible connection to the other relatively movable member, such as the axle of the vehicle.

In order to permit the fluid to flow freely from the fluid chamber or reservoir 4 into the cylinder 5 a poppet-valve is provided which, in the preferred construction, comprises a valve cage 21 having a base flange which surrounds the aperture 9 and rests upon the head 7 of the cylinder. A helical spring 22, within the cylindrical portion 12 of the casing, rests at its lower end upon the annular flange of the valve cage and at its upper end engages the under face of the piston head 13 and acts both to hold the valve cage in its seat and normally to force the piston upwardly thereby raising the arm 20 of the rock shaft and maintaining a suitable tension upon the connection between the rock shaft and the other movable member, such as the axle of the vehicle.

The valve cage 21 is provided with a central stem 23 upon which is slidably mounted a valve 24 which is normally held upon its seat on the valve casing by a helical spring 25 which is interposed between the valve 24 and a suitable abutment upon the valve stem 23. The spring 25 is a light spring which enables the valve 5 to be easily raised by the pressure of the fluid beneath it upon the upward movement of the piston so that a substantially free flow of fluid is permitted from the reservoir to the cylinder upon upward movement of the piston. In order to resist the downward or shock-absorbing movement of the piston means are provided for restricting the flow of fluid from the cylinder to the reservoir. This is accomplished in the illustrated construction by providing in the wall 6 of the cylinder a port 26 having at its outer end a countersunk wall 27 with a tubular spring-actuated valve 28 having a flange to engage the base of the countersink and a cylindrical extension projecting into the port 26, the cylindrical portion of the valve being provided with one or more ports 29 to permit the fluid to flow from the cylinder to the reservoir when the valve is moved by the pressure of the fluid in the cylinder against the action of the valve spring sufficiently to cause the valve port 29 to communicate with the reservoir.

In the construction illustrated the valve is normally retained upon its seat by a helical spring 30 abutting at one end against the flange of the valve and at its opposite end against a screw threaded plug 31 which is seated in the casing and which is provided with an axial aperture 32 to receive the stem 33 of the valve.

In the preferred construction illustrated the valve stem is provided with an axial aperture terminating in a relatively small duct which communicates with the axial aperture 32 of the plug, so that a small amount of the fluid from the cylinder may be forced through the valve stem into the aperture 32 of the plug and enter the cylinder around the valve stem which desirably is rather loosely fitted in the aperture 32 of the plug. This aperture through the valve stem permits a small amount of fluid to be forced from the cylinder into the reservoir upon each downward movement of the piston and aids to some extent in cushioning light shocks.

It is, however, desirable to have more effective means for cushioning light shocks which cause relatively slight movements of the piston and this is accomplished in the present invention by providing a restricted passage from the reservoir to the cylinder which normally permits a flow of the fluid between the reservoir and cylinder, or vice versa upon slight movements of the piston, but which is rendered ineffective by relatively great movements of the piston.

In the preferred construction illustrated the wall 6 of the cylinder is provided with a reamed aperture 34 which extends from the reservoir to the cylinder and while this aperture may be made of sufficiently small diameter to permit the desired amount of fluid to flow between the reservoir and cylinder, it desirably is of sufficient area to permit the insertion of a plug 35 having therein a restricted aperture of the desired size. Furthermore by this means different plugs having apertures of different cross sectional area may be readily substituted to provide a proper passage to accomplish the desired purpose.

The plug 35, as illustrated herein, is drilled in from its end to provide a small passage 36 and the plug is also drilled transversely to provide lateral passages 37 and 38 communicating with the passage 36.

By reason of this construction the fluid passing through the apertures 36, 37 and 38 is deflected so that greater resistance to the flow of fluid is imparted than through a direct opening and this is particularly true when the transverse passages 37 and 38 are located at a distance from the end 39 of the axial aperture, since when the fluid is forced from the cylinder through the passage 36 a portion of it will impinge upon the wall of the end 39 and in rebounding will cause an eddying of the current which will interfere with the free flow through the passages 37 and 38. Furthermore, the diversion of the current at right angles to its initial direction of flow will also impede the flow to a considerable extent.

The plug 35 desirably is provided with an enlarged screw threaded portion 40 which engages complementary screw threads in the wall of the casing and is also provided with a slotted head 41 by means of which the plug may be screwed into its seat. A fibre washer 42 desirably is interposed between the head 41 of the plug in the casing to prevent the possibility of any fluid escaping through the casing.

Any suitable means may be provided for preventing the flow of fluid between the reservoir and cylinder and vice versa during extensive movements of the piston.

As illustrated herein the cylindrical wall of the piston is provided with a port 43 which preferably is of somewhat larger diameter than the aperture 34 in the cylinder wall 6 and the port 43 of the piston is so located that when the piston is in its normal or neutral position it will be in substantially axial alinement with the aperture 34 in the cylinder wall 6 so that upon movement of the piston in either direction the passage from the reservoir to the cylinder will be closed as soon as the piston has moved a predetermined distance. Consequently the action of the supplemental means for establishing communication between the reservoir and cylinder and vice versa will be rendered ineffective when the piston moves through any considerable distance and the piston will thereafter be subject solely to the control of the spring-actuated valve 28.

In the operation of the device a slight upward movement of the piston draws a small amount of fluid from the reservoir through the passages 38, 37 and 36 into the cylinder which may or may not be supplemented by fluid drawn through the port 9 in the cylinder head. Upon slight downward movement of the piston the fluid thus drawn into the cylinder is forced through the port 43 of the cylinder and the passages 36, 37 and 38 into the reservoir, the resistance to the flow of the fluid through these narrow passages being ordinarily sufficient to cushion the lighter shocks without the displacement of the valve 28.

This restricted supplemental passage for the fluid permits a substantially increased speed of vibration of the arm 20 which is connected to one of the relatively movable members, such as the axle of the vehicle, and more effectively cushions such slight movements as are produced, for example, where the vehicle is passing over a cobble-paved street or slightly rough spots in the road.

If the piston is moved upwardly sufficiently to cause the port 43 to pass by the aperture 34, the downward movement of the piston is subjected entirely to the resistance caused by the spring-actuated valve 28 which thereby offers its maximum resistance. When, however, the piston approaches its neutral position the port 43 again communicates with the aperture 34 and permits fluid to flow from the cylinder into the reservoir more rapidly thereby more quickly restoring the piston to its normal position. If the vibration is so great as to cause the port 43 to pass downwardly beyond the aperture 34 in the cylinder wall the movement of the piston is again subjected to the full resistance of the valve 28 which tends more quickly to check the descent of the piston, and upon the upward movement of the piston thereafter the port 43 again registers with the aperture 34 and permits fluid to flow from the reservoir into the cylinder, thus tending more quickly to establish a balanced pressure between the fluid in the cylinder and that in the reservoir, and thereby to more quickly restore the piston to its normal or neutral position.

It will thus be seen that the present invention provides supplemental means operable only when the piston is in proximity to normal position to establish balanced pressure between the fluid in the cylinder and the reservoir.

It will be understood that the particular embodiment of the invention disclosed herein is illustrative and not restrictive and that various changes in form, construction and arrangement of parts may be made within the spirit and scope of the following claims.

Having thus described the invention, what is claimed as new, and desired to be secured by Letters Patent, is:

1. A shock absorber comprising a fluid-containing reservoir, a cylinder, a tubular piston reciprocable in said cylinder, a port having a valve operable to provide a substantially free flow of fluid from said reservoir into said cylinder upon movement of the piston in one direction, means for restricting the flow of fluid from the cylinder into said reservoir upon movement of the piston in the opposite direction, the wall of said cylinder being provided with an aperture leading from said reservoir to said cylinder, a plug removably seated in the wall of said reservoir extending into said aperture and having means to allow a restricted flow of fluid from said cylinder to said reservoir, a port in said tubular piston, of greater area than that of said aperture in the cylinder wall, positioned to communicate with said aperture when the piston is in normal position, but movable out of such communication upon movement of the piston beyond a predetermined distance from said normal position.

2. A shock absorber comprising a fluid-containing reservoir, a cylinder, a piston reciprocable in said cylinder, means permitting a substantially free flow of fluid from said reservoir into said cylinder upon movement of the piston in one direction, means restricting the flow of fluid from the cylinder into said reservoir upon movement of the piston in the opposite direction, the wall of said cylinder being provided with an aperture leading from said reservoir to said cylinder, a plug removably mounted in said aperture having a restricted passage communicating with said reservoir and said cylinder and a port in said piston of greater area than that of the aperture in said cylinder wall communicating therewith when the piston is in normal position, but movable out of such communication upon movement of the piston beyond a predetermined distance from normal position.

3. A shock absorber comprising a fluid-containing reservoir, a cylinder, a piston reciprocable in said cylinder, means permitting a substantially free flow of fluid from said reservoir into said cylinder upon movement of the piston in one direction, means restricting the flow of fluid from the cylinder into said reservoir upon movement of the piston in the opposite direction, the wall of said cylinder being provided with an aperture leading from said reservoir to said cylinder, a plug removably mounted in said aperture having an axial passage communicating with said cylinder and one or more transverse passages leading from said axial passage to said reservoir acting to deflect the flow of fluid abruptly and thereby to resist its flow through said passages and a port in said piston communicating with said cylinder aperture when the piston is in normal position, but movable out of such communication upon movement of the piston beyond a predetermined distance from normal position.

4. A shock absorber comprising a casing presenting a fluid-containing reservoir and an enclosed cylinder, a tubular piston reciprocable in said cylinder and provided with a lateral port, means permitting a substantially free flow of fluid from said reservoir into said cylinder upon movement of the piston in one direction, means for restricting the flow of fluid from said cylinder into said reservoir upon movement of the piston in the opposite direction, said cylinder wall having an aperture leading to said reservoir communicating with the port in said piston when the piston is in normal position, a plug seated in said aperture having an axial restricted passage leading to said port and lateral passages leading to said reservoir and a screw threaded connection between the stem of said plug and said casing.

In testimony whereof I have signed my name to this specification.

RALPH M. LOVEJOY.